US012754929B2

(12) United States Patent
Jamloki et al.

(10) Patent No.: US 12,754,929 B2
(45) Date of Patent: Oct. 6, 2026

(54) CHECKSUM MECHANISM FOR DATA REPLICATION IN BATCHES

(71) Applicant: International Business Machines Corporation, Armonk, NY (US)

(72) Inventors: Shailesh Chandra Jamloki, Noida (IN); Kiran K. Venkatachala, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/000,031

(22) Filed: Dec. 23, 2024

(65) Prior Publication Data

US 2026/0178612 A1 Jun. 25, 2026

(51) Int. Cl.
*G06F 16/27* (2019.01)
*G06F 16/23* (2019.01)

(52) U.S. Cl.
CPC .......... *G06F 16/27* (2019.01); *G06F 16/2365* (2019.01)

(58) Field of Classification Search
CPC ...... G06F 16/27; G06F 16/273; G06F 16/275; G06F 16/278; G06F 16/2365
USPC ........................................................ 707/625
See application file for complete search history.

(56) References Cited

U.S. PATENT DOCUMENTS

| | | | | |
|---|---|---|---|---|
| 10,795,777 | B1 * | 10/2020 | Goyal | G06F 11/1464 |
| 10,956,403 | B2 | 3/2021 | Bourbonnais et al. | |
| 12,007,977 | B1 | 6/2024 | Singh et al. | |
| 12,541,535 | B1 * | 2/2026 | Hoffmann | G06F 16/273 |
| 2008/0189498 | A1 * | 8/2008 | Brown | G06F 11/2097 711/162 |
| 2014/0372374 | A1 * | 12/2014 | Bourbonnais | G06F 16/27 707/613 |
| 2017/0193004 | A1 * | 7/2017 | Karuppusamy | G06F 16/184 |
| 2019/0370368 | A1 | 12/2019 | Kim et al. | |

* cited by examiner

*Primary Examiner* — Michael Pham
(74) *Attorney, Agent, or Firm* — Yee & Associates, P.C.

(57) ABSTRACT

A method verifies data integrity in a data replication. Changes to data in a source database are received. The changes are for replication in a target database. A batch of data is created from the changes to the data. A target checksum is determined for the batch of data. Whether the data integrity is present for the batch of data is determined from a comparison of the target checksum with a source checksum for the batch of data. Data in the batch of data is replicated in which the data integrity is present.

20 Claims, 10 Drawing Sheets

CHECKSUM MECHANISM FOR DATA REPLICATION IN BATCHES

BACKGROUND

The disclosure relates generally to an improved computer system and more specifically to a checksum mechanism for data replication in batches.

Data replication is a process in which copies of data can be stored on multiple locations such as on devices or servers. This redundancy ensures that if one copy becomes unavailable, the data can still be accessed from another location. Data replication is commonly used to maintain consistency between databases. Thus, data replication can provide fault tolerance, high availability, disaster recovery, and load-balancing.

As part of the replication process, mechanisms can be used to ensure that the data being replicated is accurate and consistent to avoid data corruption and other issues. One approach to ensuring data consistency is to implement a checksum mechanism that verifies the integrity of the data being replicated. This checksum mechanism calculates a hash value for the data being replicated and compares it with the corresponding hash value in the target database. The data has been replicated successfully when a match is present between hash values. A lack of a match between the hash values indicates that the data may have been corrupted during replication.

SUMMARY

According to one illustrative embodiment, a method verifies data integrity in a data replication. Changes to data in a source database are received. The changes are for replication in a target database. A batch of data is created from the changes to the data. A target checksum is determined for the batch of data. Whether the data integrity is present for the batch of data is determined from a comparison of the target checksum with a source checksum for the batch of data. Data in the batch of data is replicated in which the data integrity is present. According to other illustrative embodiments, a computer system and a computer program product for verifying data integrity are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
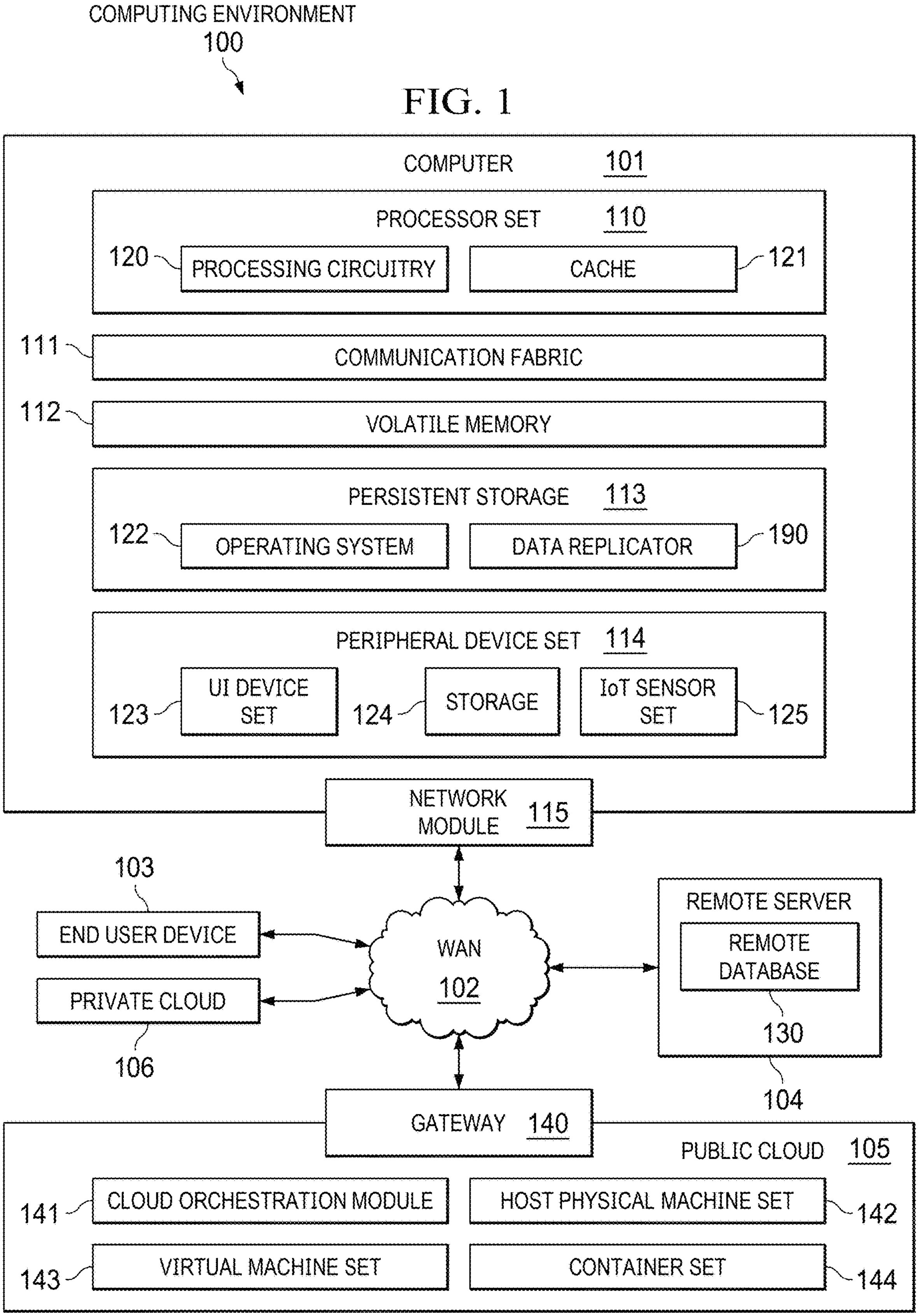
FIG. 1 is a block diagram of a computing environment in accordance with an illustrative embodiment.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as data replicator 190. In addition to data replicator 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and data replicator 190, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in data replicator 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in data replicator 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES: Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The illustrative embodiments recognize and take into account one or more different considerations as described herein. For example, data replication tools can perform replication between different instances of the same database including mechanisms for ensuring data accuracy such as checksums or other validation techniques. Other tools can include extract transform load (ETL) tools that can move data between databases or data sources. These tools also include mechanisms for ensuring data consistency using checksums or data validation rules.

However, these and other tools do not ensure data consistency and data replication processes that work in batches. These types of systems do not work for data replication in which batches have configurable batch size and especially when the batch size can vary between batches of data.

Thus, the illustrative examples provide a checksum mechanism for data replication in batches with the configurable batch size. As a result, data replication processes can be performed to ensure accuracy and consistency in replicating data using batches that are configurable in size without sacrificing performance or scalability.

In one illustrative example, a method verifies data integrity in a data replication. Changes to data in a source database are received. The changes are for replication in a target database. A batch of data is created from the changes to the data. A target checksum is determined for the batch of data. Whether the data integrity is present for the batch of data is determined from a comparison of the target checksum with a source checksum for the batch of data. Data in the batch of data is replicated in which the data integrity is present.

Figure 2:
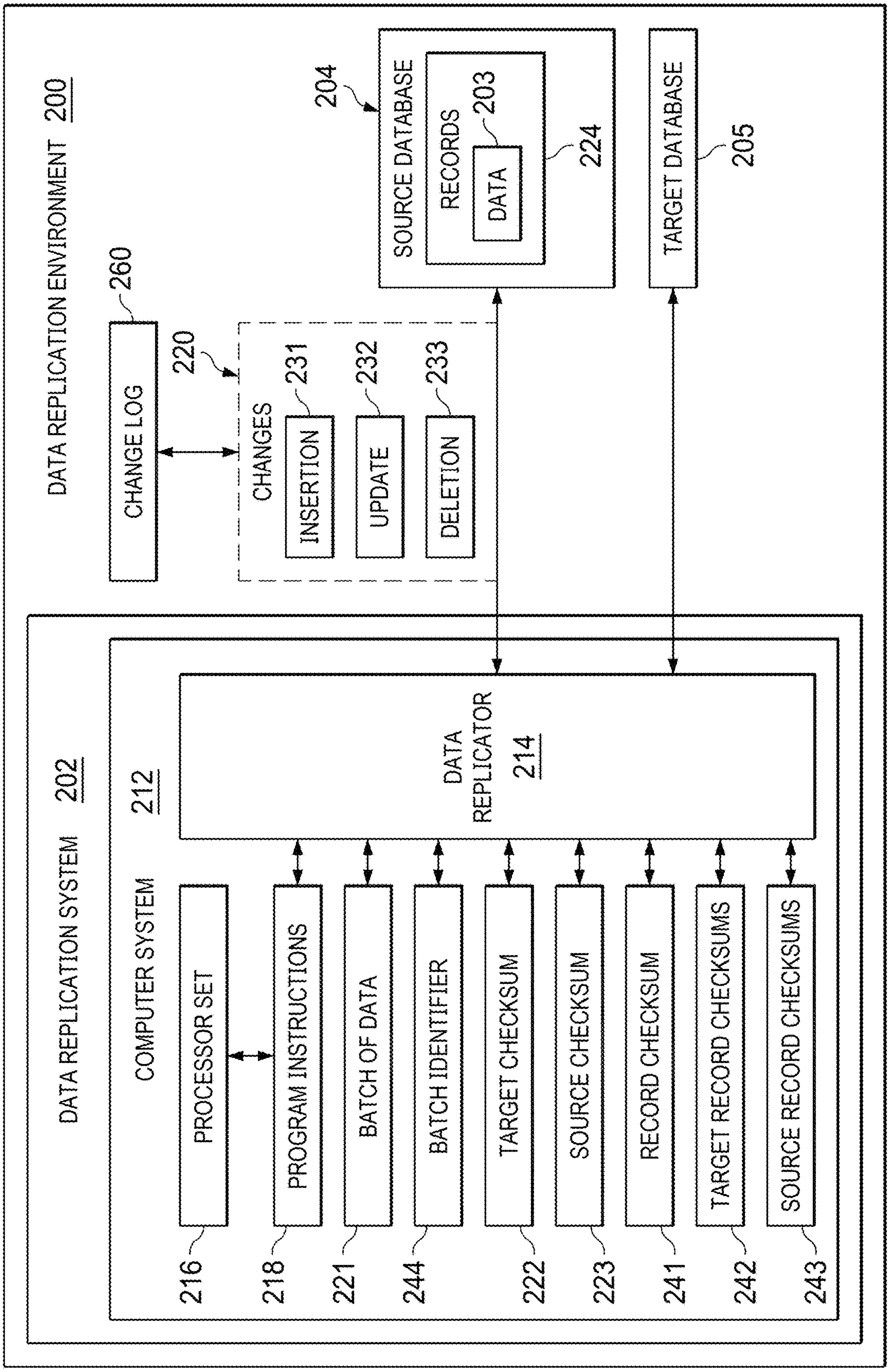
FIG. 2 is a block diagram of a data replication environment in accordance with an illustrative embodiment.

With reference now to FIG. 2, a block diagram of a data replication environment is depicted in accordance with an illustrative embodiment. In this illustrative example, data replication environment 200 includes components that can be implemented in hardware such as the hardware shown in computing environment 100 in FIG. 1.

In this example, data replication system 202 can operate to replicate data 203 from source database 204 to target database 205. Data 203 can take a number of different forms. For example, data 203 can be objects, images, files, tables, documents, strings, or other suitable forms.

In this illustrative example, data replication system 202 can replicate data 203 from source database 204 to target database 205 in batches that have a batch size that is configurable. In other words, different batches can have different sizes. For example, one batch of data 203 can be 100 records, while another batch of data 221 can be 10 records, 333 records, 700 records, 1000 records, or some other number of records.

Further, the batches of data 203 can be replicated in real time. With real-time replication, batches of data 203 can have a batch size that changes. For example, a batch size can be set to be 1000 records or as many records to 1000 records that are identified for replication within a millisecond. If only 300 records are identified for replication, then the batch size is 300 records instead of 1000 records for that particular batch. As a result, the batch size can change from batch to batch in replicating data from source database 204 to target database 205.

As depicted, data replication system 202 comprises computer system 212 and data replicator 214. Data replicator 214 is located in computer system 212. Data replicator 214 may be implemented using data replicator 190 in FIG. 1.

In this example, data replicator 214 can be implemented in software, hardware, firmware, or a combination thereof. When software is used, the operations performed by data replicator 214 can be implemented in program instructions configured to run on hardware, such as a processor unit. When firmware is used, the operations performed by data replicator 214 can be implemented in program instructions and data and stored in persistent memory to run on a processor unit. When hardware is employed, the hardware can include circuits that operate to perform the operations in data replicator 214.

In the illustrative examples, the hardware can take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and a number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes processor set 216 that is capable of executing program instructions 218 implementing processes in the illustrative examples. In other words, program instructions 218 are computer-readable program instructions. Processor set 216 is an example of processor set 110 in FIG. 1.

As used herein, a processor unit in processor set 216 is a hardware device and is comprised of hardware circuits such as those on an integrated circuit that respond to and process instructions and program code that operate a computer. Processor set 216 can be a number of processor units that can be implemented using processor set 110 in FIG. 1. The processor units can also be referred to as computer processors. When processor set 216 executes program instructions 218 for a process, processor set 216 can be one or more processor units that are in the same computer or in different computers. In other words, the process can be distributed between processor units in processor set 216 on the same or different computers in computer system 212.

Further, processor set 216 can include the same type or different types of processor units. For example, processor set 216 can be selected from at least one of a single core processor, a dual-core processor, a multi-processor core, a general-purpose central processing unit (CPU), a graphics processing unit (GPU), a digital signal processor (DSP), or some other type of processor unit.

Although not shown, processor set 216 can also include other components in addition to the processor units or processing circuitry. For example, processor set 216 can also include a cache or other components used with processor units or other processing circuitry.

In one illustrative example, data replicator 214 operates to verify data integrity in data replication of data 204 from source database 204 to target database 205. For example, data replicator 214 receives changes 220 to data 203 in source database 204. In this example, changes 220 are for replication in target database 205. In this illustrative example, changes 220 can take a number of different forms. For example, changes 220 can be at least one of insertion 231 of data 203, update 232 to data 203, or deletion 233 of data 203.

Data replicator 214 creates batch of data 221 from changes 220 to data 203 in source database 204. Data replicator 214 determines target checksum 222 for batch of data 221. Data replicator 214 determines whether the data integrity is present for batch of data 221 from a comparison of target checksum 222 with source checksum 223 for batch of data 221. In this example, data replicator 214 replicates data 203 in batch of data 221 in which the data integrity is present. The data integrity can be for some or all of batch of data 221. In this example, target checksum 222 and source checksum 223 can be used to determine which portion or portions of data in batch of data 221 has data integrity. Those portions identified as having data integrity can be replicated while other portions that do not have data integrity are not replicated in target database 205.

In one example, batch of data 221 created by data replicator 214 can comprise changes 220 to data 203 in records 224 in source database 204. With this example, in determining target checksum 222, data replicator 214 can determine target record checksum 241 for each record in the batch of data 221 received by target database 205 to form target record checksums 242.

Further with this example, data replicator 214 aggregates target record checksums 242 for records 224 having changes 220 to form target checksum 222. Additionally, data replicator 214 aggregates source record checksums 243 determined for corresponding records in source database 204 to form source checksum 223. If the comparison of source checksum 223 does not match targe checksum 222, the records checksums aggregated to form source checksum 223 and targe checksum 222 can be compared to determine which records have data integrity and which records do not have data integrity.

In this illustrative example, source record checksums 243 can be received in records 224 received from source database 204. These records can be received as changes 220. In this example, these corresponding records for records 224 in source database 204 that correspond to records 224 in batch of data 221 received for target database 205.

Data replicator 214 can associate records 224 in batch of data 221 with each other. For example, records 224 belonging to batch of data 221 for replication can be associated with using batch identifier 244. With this example, data replicator 214 associates each record in batch of data 221 with batch identifier 244. In other words, all records in batch of data 221 have the same batch identifier.

In replicating data 203 in batch of data 221, data replicator 214 replicates data 203 in batch of data 221 for which data integrity is present using batch identifier 244. With this example, some of data 203 may not have data integrity. As a result, only data with data integrity is replicated. In these examples, data 203 is located in records 224. Records 224 in batch of data 221 identified by batch identifier 244 having data integrity are replicated while other records in batch of data 221 identified by batch identifier 244 without data integrity are not replicated.

In this illustrative example, data replicator 214 can select an algorithm to determine source checksum 223 and target checksum 222 based on data 203 in batch of data 221. The algorithm is selected to at least one of optimize performance in the data replication or increase an ability to detect an error in the data replication. For example, a different algorithm for determining checksums can be used for images, and another algorithm for determining checksums can be used for integer data.

Also, data replicator 214 can select a batch size for batch of data 221. The batch size can be automatically adjusted based for each batch of data based at least one of on the amount of data being replicated or available resources. This type of automatic adjustment in the batch size can be selected to at least one of optimize performance in the data replication or increase an ability to detect an error in the data replication. For example, a larger batch size may be selected to reduce overhead associated with frequent transmissions of data. As another example, the batch size may be selected to be smaller such that transmission errors can be reduced.

In this example, change log 260 can be used to send changes 220 from source database 204 to replication in target database 205. In this example, change log 260 is a record or data structure that tracks modifications. A change log can include one or more changes. In one example, the modifications can be, for example, insertion 231, update 232, and deletion 233 made to source database 204.

Change log 260 can include details such as the type of operation and data 203 affected. The identification of data 203 affected can include data 203 before and after the change made to data 203. Further, metadata such as timestamps, operation type, and other information can be included in change log 260.

In these examples, source checksum 223 and source record checksums 243 can also be included in change log 260. This change log is used by data replicator 214 to apply or commit changes 220 to target database 205 in response to determining that data integrity is present in changes 220 to data 203 identified in change log 260.

In one illustrative example, one or more technical solutions are present that overcome a technical problem with replicating data from a source database to target database in which configurable batch sizes are present. As a result, one or more technical solutions may provide a technical effect in which checksums are created for batches of data and in which the batches of data can be configurable in size. In these examples, batches of data can change during the replication process of replicating data from source database 204 to target database 205. In this example, a database is a collection of structured information or data that can be managed by a database engine such as a database management system.

In this illustrative example, the data replication performed by data replicator 214 is performed using runtime data that is available during the replication process. In these examples, the checksum determination and comparison are performed in real time during the sending of batches of data from source database 204 to target database 205 for replication. This is in contrast to current techniques to form checksums on the databases as a whole rather than in batches of data as in these illustrative examples. As a result, data replicator 214 reduces at least one of a load on a database, maintenance activity needed, downtime, and other operations performed using checksums determined for a database.

In these illustrative examples, data replicator 214 provides a checksum mechanism for data replication of data in which a checksum mechanism is implemented for batches of data and in which a configurable batch size is present. In these examples, this implementation of the checksum mechanism by data replicator 214 does not require implementation within a database such as source database 204 or target database 205. Instead, the processes can be implemented on database engines that send or receive changes to the databases. Further, this checksum process implemented in data replicator 214 can be performed without requiring additional components or configurations in these databases. A database engine is a software component that provides core service and functionality for managing, storing, retrieving, and manipulating data in a database. In this example, a database engine can be a component within a database management system (DMBS). The system can also include other components for querying, user management, query execution, security, and other functions.

In this example, batch sizes for batches of data can be adjusted during the identification and sending of changes from source database 204 to target database 205. This type of adjustment can perform automatically based on the amount of data being replicated and available resources to optimize performance.

Further, in the illustrative example, data replicator 214 can implement a multilevel checksum rate. For example, batch level checksums, such as target checksum 222 or source checksum 223, can be used in conjunction with a more granular level in which checksums, such as target record checksums 242 and source record checksums 243, are generated for each record in a batch of data 221.

In addition, by implementing the checksum mechanism as part of the process for sending and applying changes during replication, the progress of data replication can be monitored in real time and issues can be identified more quickly as compared to analyzing the database after replication has been completed. Further, the different illustrative examples enable selecting an algorithm for determining checksums that are based on the data being replicated in other factors to optimize performance and ensure correct and consistent replication of data.

The illustration of data replication environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, data replicator 214 is shown as a separate component from source database 204 and target database 205. In one illustrative example, data replicator 214 can be located in at least one of source database 204 or target database 205. In another example, changes to source database 204 can be replicated at one or more target bases in addition to target database 205. With this example, different batch sizes can be configured for the different target databases.

In the illustrative example, data 203 is shown as being located in records 224. In other lesser examples, data 203 can be located in a file structure, a folder, a table, a row in a table, an array, matrix, or in some other suitable form.

Figure 3:
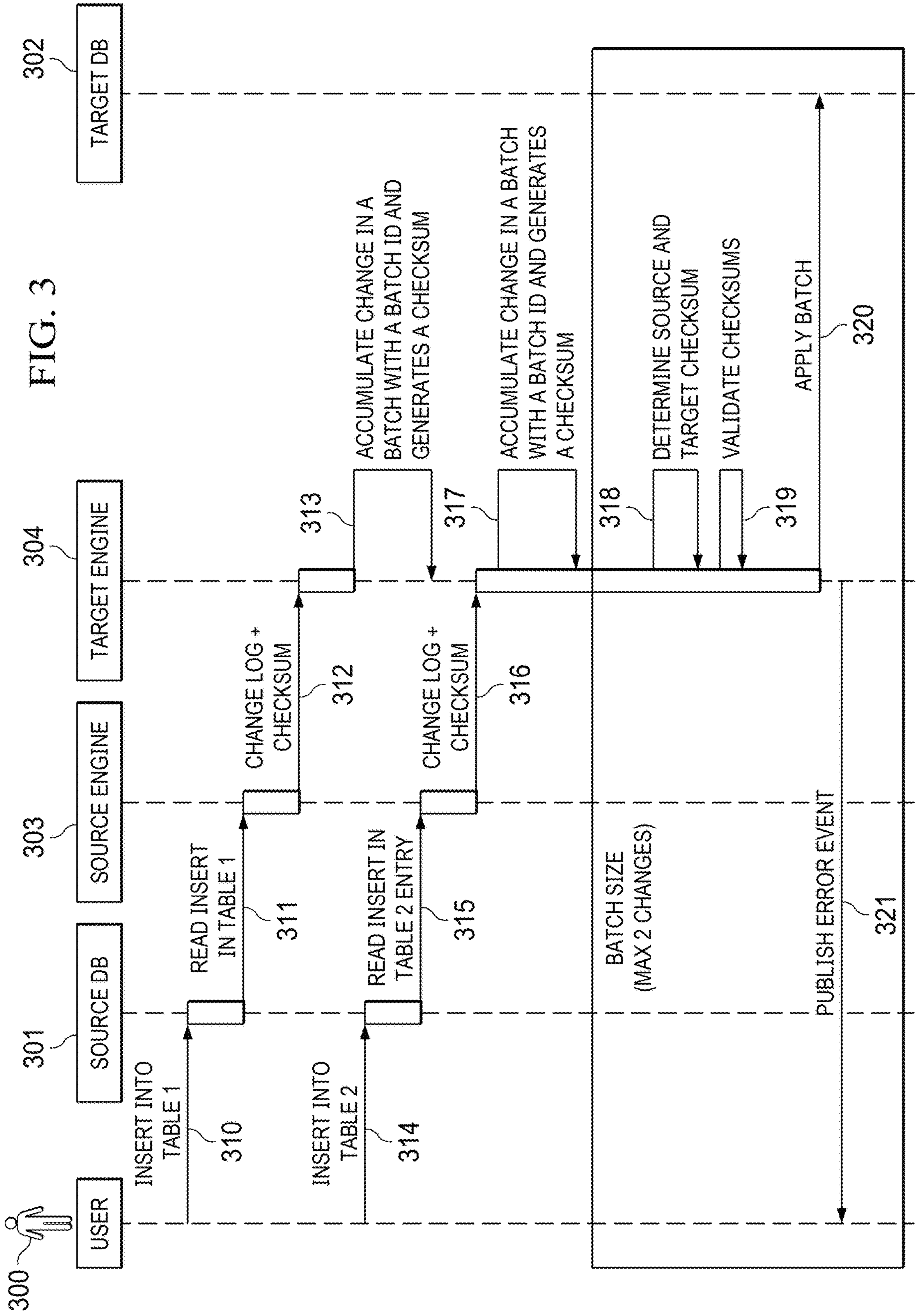
FIG. 3 is a data flow diagram for the checksum process used in data replication in accordance with an illustrative embodiment.

Turning now to FIG. 3, a data flow diagram for the checksum process used in data replication is depicted in accordance with an illustrative embodiment. In this example, user 300 can perform operations on source database 301. These operations include inserting data, deleting data, and updating data in source database 301. These changes can be applied to target database 302 as part of a replication process. In this example, source engine 303 and target engine 304 are components that can be implemented in data replicator 214 in FIG. 2 to implement checksum mechanisms in the data replication.

For example, user 300 inserts data into table 1 and source database 301 (step 310). With this example, source engine 303 reads the insert in table 1 (311). In response to reading the insert in table 1. Source engine 303 generates and sends a change log with a checksum to target engine 304 (step 312). The checksum is generated using the change in table 1.

Target engine 304 receives this change log with the source checksum and accumulates the change in the change log and the checksum in association with a batch ID and generates a checksum (step 313). In this example, the change in the change log to table 1 is used to generate a checksum.

For example, user 300 also inserts data into table 2 in source database 301 (step 314). Source engine 303 reads the insert in table 2 (315). In response to reading the insert in table 1. Source engine 303 generates and sends another change log with a checksum to target engine 304 (step 316). In step 316, the checksum is generated using the change in table 2.

Target engine 304 receives this change log with the checksum and accumulates the change and the check sum in the change log in association with a batch ID and generates a checksum (step 317). In this example, the insert to table 1 and the insert to table 2 both have the same batch ID. In this example, this change log is the second change received for the batch. The checksum determined in step 317 is another checksum in addition to the checksum determined for the insert to table 1 identified in the change log received in step 312.

In this example, the batch size for the batch of data is two. With these two changes, target engine 304 determines a source checksum and a target set checksum (step 318). The source checksum is an aggregation of the checksum received in the change logs received in step 312 and step 316. In this example, each change log contains one change. A change log with a single change can also be referred to as a change log entry.

The target checksum is an aggregation of the checksum generated in step 313 and step 317. The process then validates the checksums (step 319). In step 319, validation involves comparing the checksums to see if the values are the same. If the values are the same, then the checksums are validated.

If the checksums are the same, the process applies the batch to target database 302 (step 320). Thus, the changes in which data is inserted into table 1 and table 2 are made in response to the checksums being validated.

In response to the checksums not matching, the process publishes an error event (step 321). In response to an error event occurring, the aggregated checksums can be compared to determine whether the error occurred in the change to table 1 or the change to table 2.

The illustration of the process in FIG. 3 is provided as an example to illustrate the checksum mechanism and not meant to limit the manner in which other illustrated examples can be implemented. For example, other batch sizes can be used such as five, 100, 2000, or some other number of changes. In another illustrative example, other types of changes such as an update or deletion of data in a table can be operations that occur resulting in change log entries.

Figure 4:
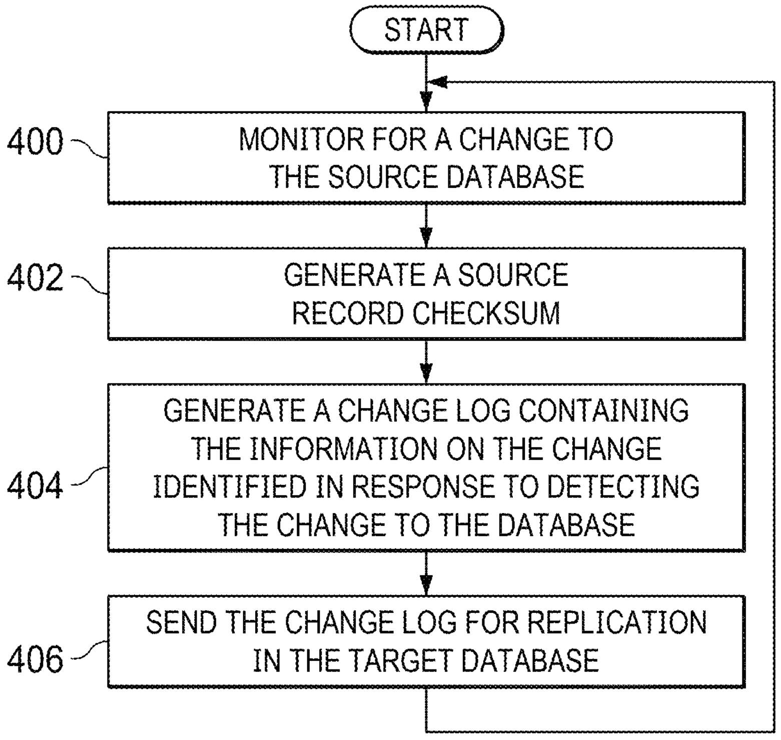
FIG. 4 is a flowchart of a process for sending change replication in accordance with an illustrative embodiment.

Turning now to FIG. 4, a flowchart of a process for sending change replication is depicted in accordance with an illustrative embodiment. The process in the illustrative example can be implemented using data replicator 214 in FIG. 2. In one illustrative example, these steps can be implemented in source engine 303 in FIG. 3. In this example, the changes are to records in a database.

The process begins by monitoring for a change to the source database (step 400). In step 400, this change can be determined by examining archive logs for the source database. The change can be, for example, an insertion, an update, or a deletion.

The process generates a source record checksum (step 402). This source record checksum can be a source record checksum in source record checksums 243 in FIG. 2.

The process generates a change log containing the information on the change identified in response to detecting the change to the database (step 404). This change log can include, for example, the data before the change and the data after the change. This change log can also include an identification of a table where the change occurred, the type of operation, a timestamp, and other information that can be used to replicate the change in a target database. In this example, the source record checksum is included in the change log. In another example, the source record checksum can be sent in association with the change log. For example, a change log identifier can be associated with the change log and the source record checksum.

The process sends the change log for replication in the target database (step 406). The process returns to step 400 to monitor for and process additional changes to the source database.

Figure 5:
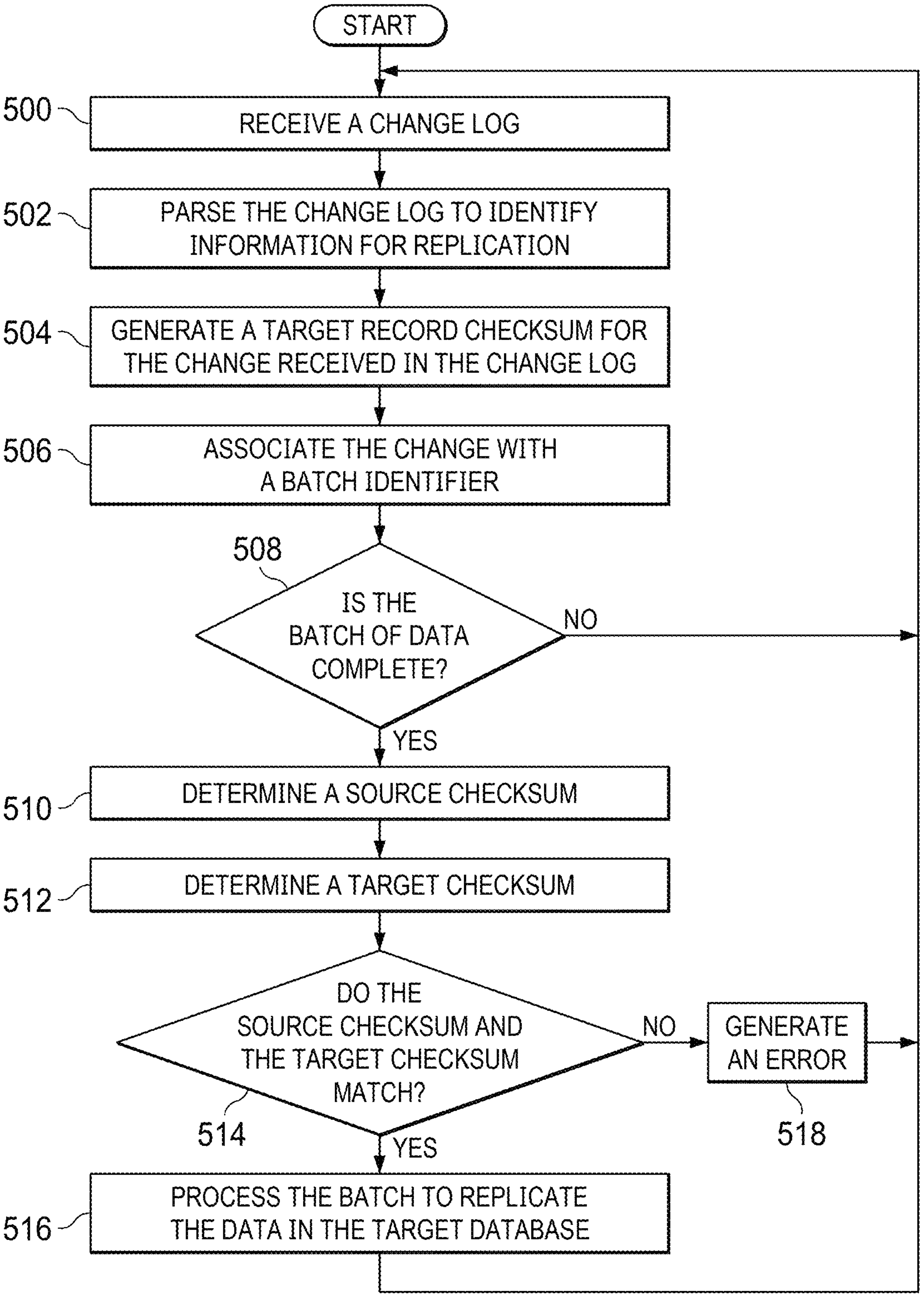
FIG. 5 is a flowchart of a process for sending change replication in accordance with an illustrative embodiment.

With reference next to FIG. 5, a flowchart of a process for sending change replication is depicted in accordance with an illustrative embodiment. The process in the illustrative example can be implemented using data replicator 214 in FIG. 2. In one illustrative example, these steps can be implemented in target engine 304 in FIG. 3. In this example, the changes are to records in a database.

The process beings by receiving a change log (step 500). The process parses the change log to identify information for replication (step 502). In step 502, the process identifies the change to the data, and other information needed to replicate the change in the target database. This information includes, for example, the data before the change, the data after the change, the location of the change (such as a table), a timestamp, a source record checksum, and other suitable information.

The process generates a target record checksum for the change received in the change log (step 504). In step 504, this checksum can be a target record checksum in target record checksums 242.

The process associates the change with a batch identifier (step 506). This batch identifier is used to group changes received in change logs into a batch of data for processing.

A determination is made as to whether the batch of data is complete (step 508). In step 508, the batch size is configurable. For example, the batch size can be two, seven, 20, 700, 1000, or some other number of changes. Further, this determination can also include rules or conditions that can affect the maximum size of the batch size. For example, in addition to a maximum batch size, the process can determine whether a period of time has expired. For example, the period of time can be 1 millisecond. With this example, the batch size comprises all of the changes that are present in the batch of data up to the maximum batch size.

If the batch of data is complete, the process determines a source checksum (step 510). In this example, the source checksum is an aggregation of the source record checksums in the batch. The process determines a target checksum (step 512). In step 512, the target checksum is an aggregation of the target record checksums generated for the batch.

The process determines whether the source checksum and the target checksum match (step 514). In step 514, this comparison of the checksums is used to validate the checksums. If the checksums match, the process processes the batch to replicate the data in the target database (step 516). The process then returns to step 500 as described above.

With reference again to step 514, if the source checksum and the target checksum do not match, the process generates an error (step 518). The process returns to step 500.

In step 518, the error can indicate that a mismatch is present between the source checksum and the target checksum. In another illustrative example, the process can determine which particular changes in the batch have an error by examining the aggregated source record checksums and aggregated target record checksums. In other words, the checksums for individual changes can be identified from the aggregated checksums and those checksums can be used to determine which changes have errors.

With reference again to step 508, if a batch of data is not complete, the process returns to step 500.

Thus, with the processes in FIG. 4 and FIG. 5, the generation of checksums and determination of whether errors are present can be performed based on the changes without needing to access the databases directly. The different steps can be performed as part of the process for generating and sending changes for replication without needing additional operations to be performed on the source or target database. Thus, the performance verifying data integrity for replication can be increased by reducing operations or access to the database.

Figure 6:
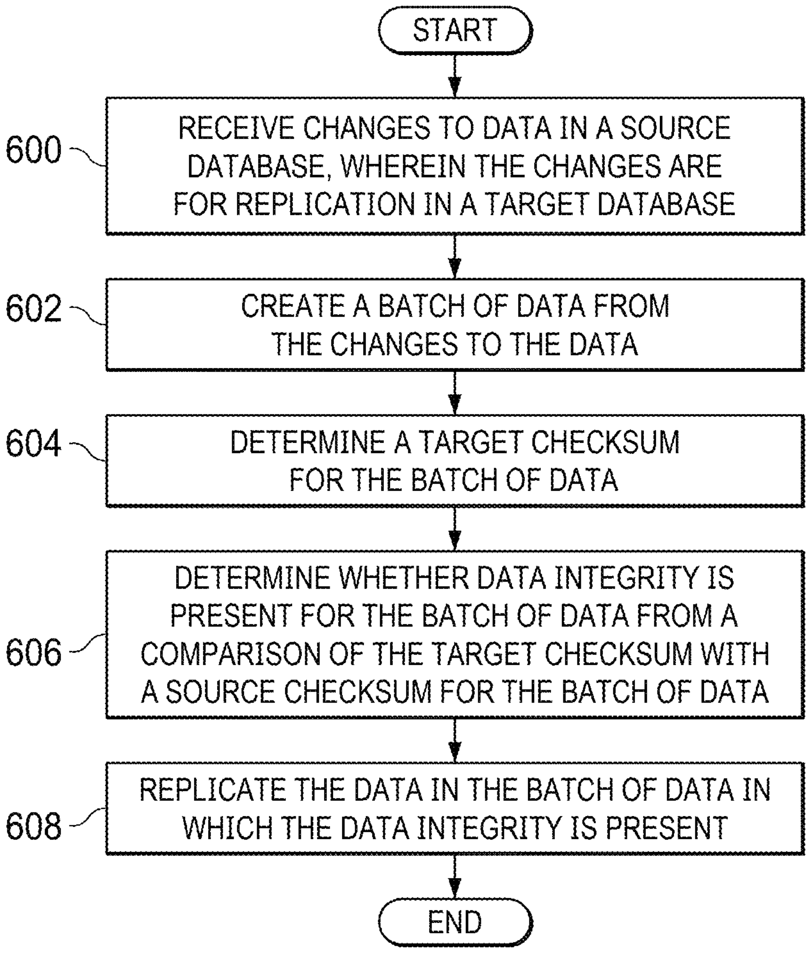
FIG. 6 is a flowchart of a process for determining data integrity in a data replication in accordance with an illustrative embodiment.

Turning next to FIG. 6, a flowchart of a process for determining data integrity in a data replication is depicted in accordance with an illustrative embodiment. The process in FIG. 6 can be implemented in hardware, software, or both. When implemented in software, the process can take the form of program instructions that are run by a processor set located in one or more hardware devices in one or more computer systems. For example, the process can be implemented in data replicator 214 in computer system 212 in FIG. 2.

The process begins by receiving changes to data in a source database, wherein the changes are for replication in a target database (step 600). The process creates a batch of data from the changes to the data (step 602). The process determines a target checksum for the batch of data (step 604).

The process determines whether data integrity is present for the batch of data from a comparison of the target checksum with a source checksum for the batch of data (step 606). The process replicates the data in the batch of data in which the data integrity is present (step 608). The process terminates thereafter.

Figure 7:
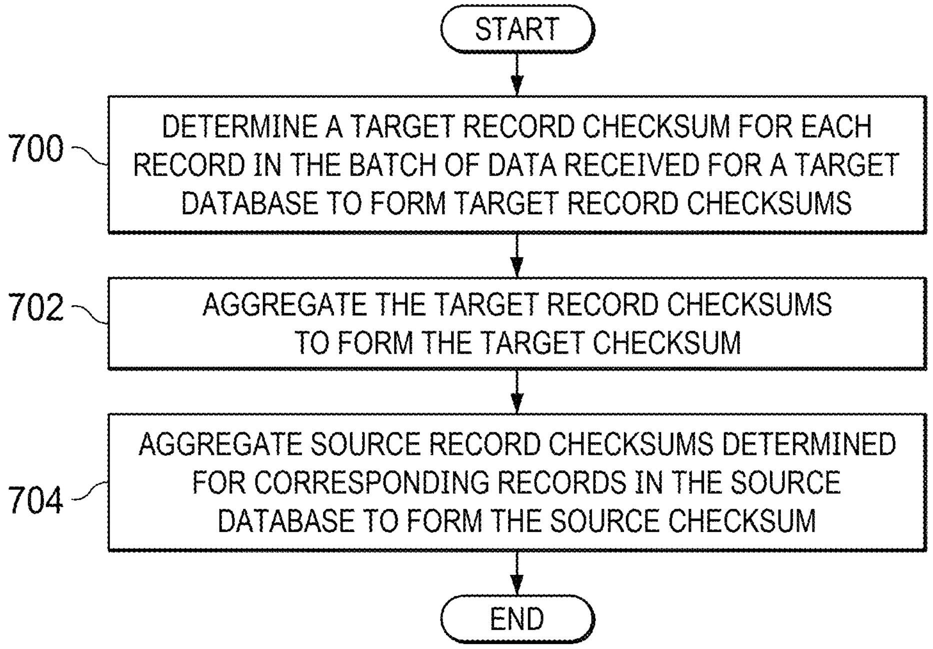
FIG. 7 is a flowchart of a process for determining the target checksums in accordance with an illustrative embodiment.

With reference next to FIG. 7, a flowchart of a process for determining the target checksums is depicted in accordance with an illustrative embodiment. The process in this flowchart is an example of an implementation for step 604 in FIG. 6. In this example, the batch of data comprises changes to the data in records in the source database.

The process determines a target record checksum for each record in the batch of data received for a target database to form target record checksums (step 700). The process aggregates the target record checksums to form the target checksum (step 702).

The process aggregates source record checksums determined for corresponding records in the source database to form the source checksum (step 704). The process terminates thereafter.

Figure 8:
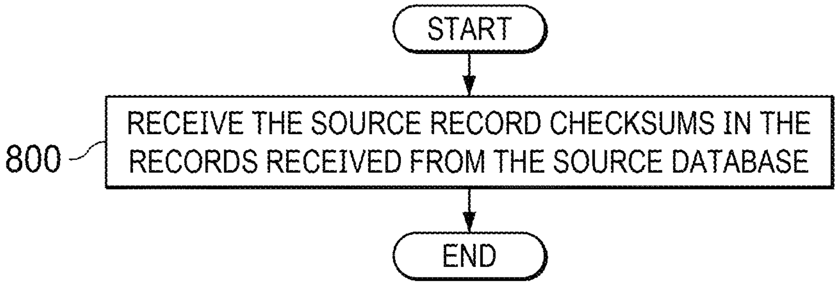
FIG. 8 is a flowchart of a process for receiving checksums from a source database in accordance with an illustrative embodiment.

In FIG. 8, a flowchart of a process for receiving checksums from a source database is depicted in accordance with an illustrative embodiment. The process in this flowchart is an example of an additional step that can be performed with the steps in FIG. 6.

The process receives the source record checksums in the records received from the source database (step 800). The process terminates thereafter.

Figure 9:
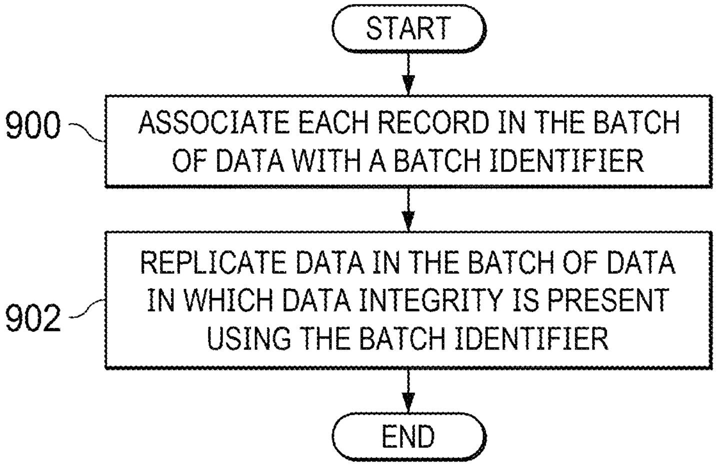
FIG. 9 is a flowchart of a process for generating and processing a batch of data in accordance with an illustrative embodiment.

Turning now to FIG. 9, a flowchart of a process for generating and processing a batch of data is depicted in accordance with an illustrative embodiment. The process in this flowchart is an example of an additional step that can be performed with the steps in FIG. 6 and FIG. 7 and an example of an implementation of step 608 in FIG. 6.

The process associates each record in the batch of data with a batch identifier (step 900). The process replicates data in the batch of data in which data integrity is present using the batch identifier (step 902). The process terminates thereafter. In this example, step 902 is an example of an implementation of step 608 in FIG. 6.

Figure 10:
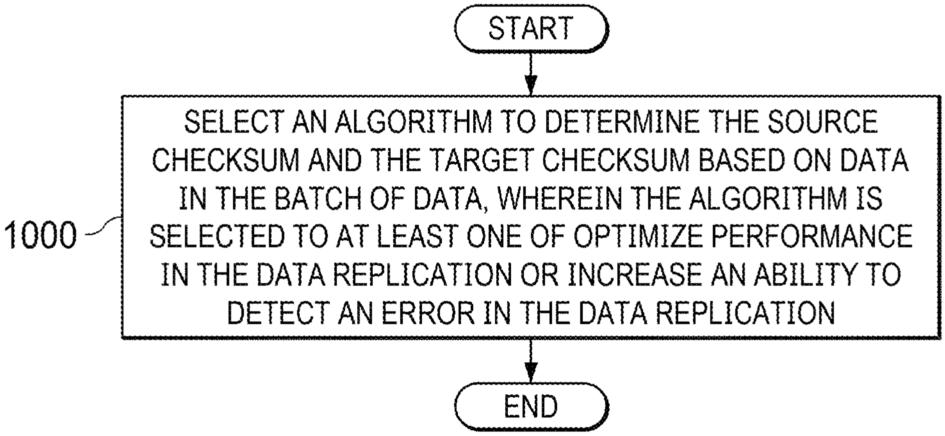
FIG. 10 is a flowchart of a process for selecting an algorithm for determining checksums in accordance with an illustrative embodiment.

Next in FIG. 10, a flowchart of a process for selecting an algorithm for determining checksums is depicted in accordance with an illustrative embodiment. This flowchart is an example of an additional step that can be performed with the steps in FIG. 6.

The process selects an algorithm to determine the source checksum and the target checksum based on data in the batch of data, wherein the algorithm is selected to at least one of optimize performance in the data replication or increase an ability to detect an error in the data replication (step 1000). The process terminates thereafter.

Figure 11:
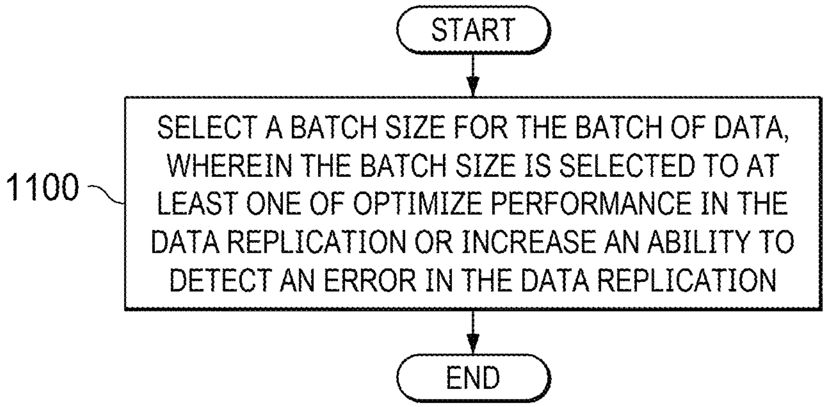
FIG. 11 is a flowchart of a process for selecting an algorithm for selecting a batch size in accordance with an illustrative embodiment.

Turning to FIG. 11, a flowchart of a process for selecting an algorithm for selecting a batch size is depicted in accordance with an illustrative embodiment. This flowchart is an example of an additional step that can be performed with the steps in FIG. 6.

The process selects a batch size for the batch of data, wherein the batch size is selected to at least one of optimize performance in the data replication or increase an ability to detect an error in the data replication (step 1100). The process terminates thereafter.

Figure 12:
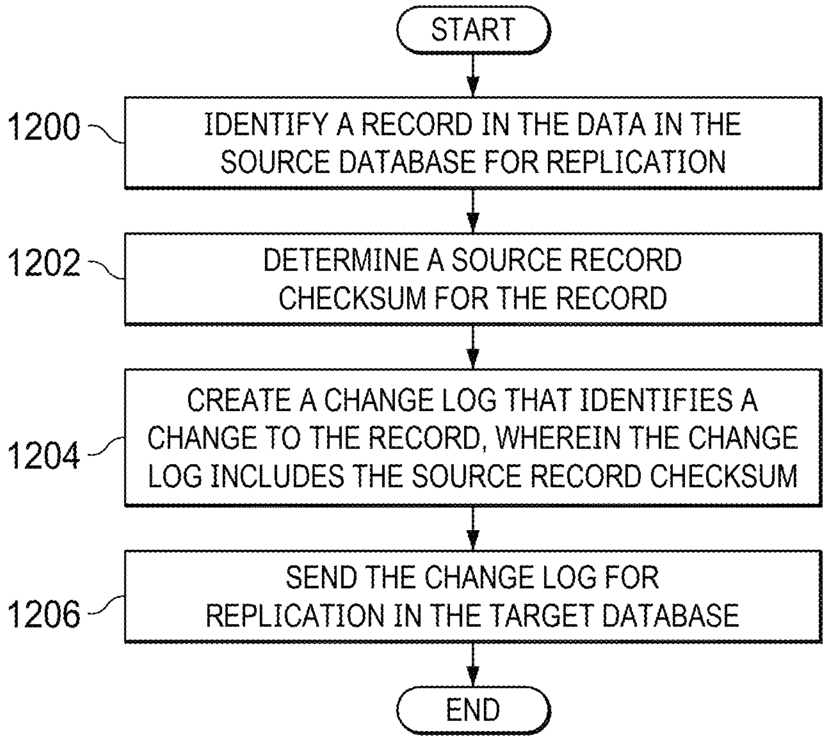
FIG. 12 is a flowchart of a process for sending a change to a source database in accordance with an illustrative embodiment.

With reference to FIG. 12, a flowchart of a process for sending a change to a source database is depicted in accordance with an illustrative embodiment. The process in this flowchart is an example of additional steps that can be performed with the steps in FIG. 6 and FIG. 7.

The process identifies a record in the data in the source database for replication (step 1200). The process determines a source record checksum for the record (step 1202).

The process creates a change log that identifies a change to the record, wherein the change log includes the source record checksum (step 1204). The process sends the change log for replication in the target database (step 1206). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 13:
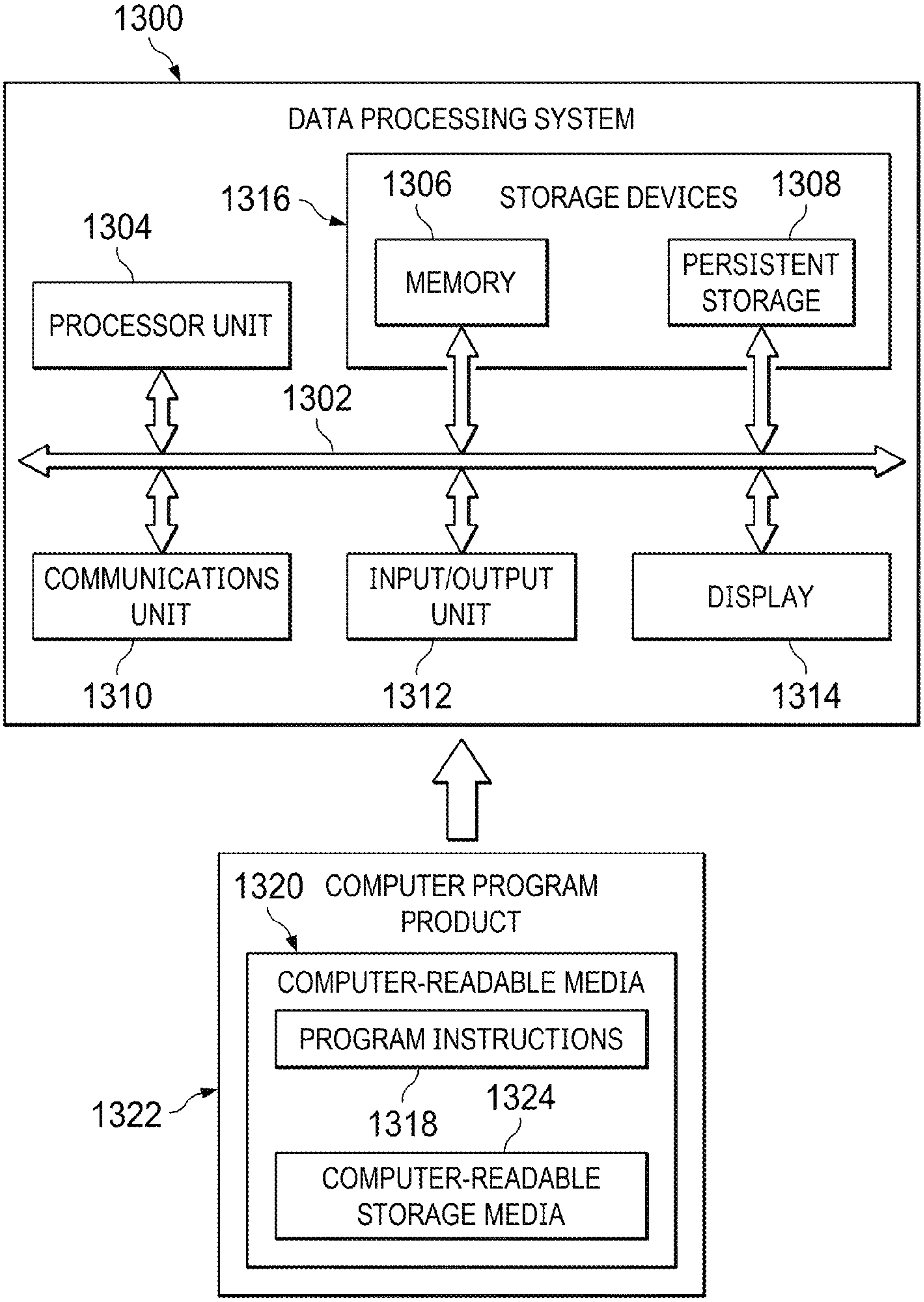
FIG. 13 is a block diagram of a data processing system in accordance with an illustrative embodiment.

Turning now to FIG. 13, a block diagram of a data processing system is depicted in accordance with an illustrative embodiment. Data processing system 1300 can be used to implement computers and computing devices in computing environment 100 in FIG. 1. Data processing system 1300 can also be used to implement computer system 212 in FIG. 2. In this illustrative example, data processing system 1300 includes communications framework 1302, which provides communications between processor unit 1304, memory 1306, persistent storage 1308, communications unit 1310, input/output (I/O) unit 1312, and display 1314. In this example, communications framework 1302 takes the form of a bus system.

Processor unit 1304 serves to execute instructions for software that can be loaded into memory 1306. Processor unit 1304 includes one or more processors. For example, processor unit 1304 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1304 can be implemented using one or more heterogeneous processor systems in which a main processor is present with secondary processors on a single chip. As another illustrative example, processor unit 1304 can be a symmetric multi-processor system containing multiple processors of the same type on a single chip.

Memory 1306 and persistent storage 1308 are examples of storage devices 1316. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1316 may also be referred to as computer-readable storage devices in these illustrative examples. Memory 1306, in these examples, can be, for example, a random-access memory or any other suitable volatile or non-volatile storage device. Persistent storage 1308 may take various forms, depending on the particular implementation.

For example, persistent storage 1308 may contain one or more components or devices. For example, persistent storage 1308 can be a hard drive, a solid-state drive (SSD), a flash memory, a rewritable optical disk, a rewritable magnetic tape, or some combination of the above. The media used by persistent storage 1308 also can be removable. For example, a removable hard drive can be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that can be connected to data processing system 1300. For example, input/output unit 1312 may provide a connection for user input through at least one of a keyboard, a mouse, or some other suitable input device. Further, input/output unit 1312 may send output to a printer. Display 1314 provides a mechanism to display information to a user.

Instructions for at least one of the operating system, applications, or programs can be located in storage devices 1316, which are in communication with processor unit 1304 through communications framework 1302. The processes of the different embodiments can be performed by processor unit 1304 using computer-implemented instructions, which may be located in a memory, such as memory 1306.

These instructions are referred to as program instructions, computer usable program instructions, or computer-readable program instructions that can be read and executed by a processor in processor unit 1304. The program instructions in the different embodiments can be embodied on different physical or computer-readable storage media, such as memory 1306 or persistent storage 1308.

Program instructions 1318 are located in a functional form on computer-readable media 1320 that is selectively removable and can be loaded onto or transferred to data processing system 1300 for execution by processor unit 1304. Program instructions 1318 and computer-readable media 1320 form computer program product 1322 in these illustrative examples. In the illustrative example, computer-readable media 1320 is computer-readable storage media 1324.

Computer-readable storage media 1324 is a physical or tangible storage device used to store program instructions 1318 rather than a medium that propagates or transmits program instructions 1318. Computer-readable storage media 1324, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1318 can be transferred to data processing system 1300 using a computer-readable signal media. The computer-readable signal media are signals and can be, for example, a propagated data signal containing program instructions 1318. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1320" can be singular or plural. For example, program instructions 1318 can be located in computer-readable media 1320 in the form of a single storage device or system. In another example, program instructions 1318 can be located in computer-readable media 1320 that is distributed in multiple data processing systems. In other words, some instructions in program instructions 1318 can be located in one data processing system while other instructions in program instructions 1318 can be located in one data processing system. For example, a portion of program instructions 1318 can be located in computer-readable media 1320 in a server computer while another portion of program instructions 1318 can be located in computer-readable media 1320 located in a set of client computers.

The different components illustrated for data processing system 1300 are not meant to provide architectural limitations to the manner in which different embodiments can be implemented. In some illustrative examples, one or more of the components may be incorporated in or otherwise form a portion of, another component. For example, memory 1306, or portions thereof, may be incorporated in processor unit 1304 in some illustrative examples. In other examples, more than one processor unit can be present. The different illustrative embodiments can be implemented in a data processing system including components in addition to or in place of those illustrated for data processing system 1300. Other components shown in FIG. 13 can be varied from the illustrative examples shown. The different embodiments can be implemented using any hardware device or system capable of running program instructions 1318.

Thus, illustrative embodiments of the present invention provide a computer implemented method, computer system, and computer program product for verifying data integrity in a data replication. In one illustrative example, a method verifies data integrity in a data replication. Changes to data in a source database are received. The changes are for replication in a target database. A batch of data is created from the changes to the data. A target checksum is determined for the batch of data. Whether the data integrity is present for the batch of data is determined from a comparison of the target checksum with a source checksum for the batch of data. Data in the batch of data is replicated in which the data integrity is present.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for verifying data integrity in a data replication, the method comprising:
- receiving changes to data in a source database, wherein the changes are for replication in a target database;
- creating a batch of data from the changes to the data, wherein the batch of data comprises changes to the data in records in the source database;
- determining a target checksum for the batch of data, wherein determining the target checksum comprises:
  - determining a target record checksum for each record in the batch of data received for a target database to form target record checksums;
  - aggregating the target record checksums to form the target checksum; and
  - aggregating source record checksums determined for corresponding records in the source database to form the source checksum;
- determining whether the data integrity is present for the batch of data from a comparison of the target checksum with a source checksum for the batch of data; and
- replicating data in the batch of data in which the data integrity is present.

2. The method of claim 1, further comprising:
- receiving the source record checksums in the records received from the source database.

3. The method of claim 1 further comprising:
- associating each record in the batch of data with a batch identifier, wherein replicating data in the batch of data comprises:
- replicating data in the batch of data in which data integrity is present using the batch identifier.

4. The method of claim 1 further comprising:
- selecting an algorithm to determine the source checksum and the target checksum based on data in the batch of data, wherein the algorithm is selected to least one of optimize performance in the data replication or increase an ability to detect an error in the data replication.

5. The method of claim 1 further comprising:
- selecting a batch size for the batch of data, wherein the batch size is selected to at least one of optimize performance in the data replication or increase an ability to detect an error in the data replication.

6. The method of claim 1 further comprising:
- identifying a record in the data in the source database for replication;
- determining a source record checksum for the record;
- creating a change log that identifies a change to the record, wherein the change log includes the source record checksum; and
- sending the change log that identifies the change to the record for replication in the target database.

7. The method of claim 1, further comprising: in response to the comparison of the target checksum with the source checksum indicating that data integrity is not present for the batch of data, comparing the source record checksums with corresponding target record checksums to identify at least one record in the batch of data for which data integrity is not present.

8. A computer system comprising:
- a processor set;
- a set of one or more computer-readable storage media; and
- program instructions, collectively stored in the set of one or more storage media to cause the processor set to perform operations comprising:
  - receiving changes to data in a source database, wherein the changes are for replication in a target database;
  - creating a batch of data from the changes to the data, wherein the batch of data comprises changes to the data in records in the source database;
  - determining a target checksum for the batch of data, wherein determining the target checksum comprises:
    - determining a target record checksum for each record in the batch of data received for a target database to form target record checksums;
    - aggregating the target record checksums to form the target checksum; and
    - aggregating source record checksums determined for corresponding records in the source database to form the source checksum;
- determining whether data integrity is present for the batch of data from a comparison of the target checksum with a source checksum for the batch of data; and
- replicating data in the batch of data in which the data integrity is present.

9. The computer system of claim 8, wherein the operations further comprise:
- receiving the source record checksums in the records received from the source database.

10. The computer system of claim 8, wherein the operations further comprise:

associating each record in the batch of data with a batch identifier, wherein replicating data in the batch of data comprises:

replicating data in the batch of data in which data integrity is present using the batch identifier.

11. The computer system of claim 8, wherein the operations further comprise:

selecting an algorithm to determine the source checksum and the target checksum based on data in the batch of data, wherein the algorithm is selected to least one of optimize performance in the data replication or increase an ability to detect an error in the data replication.

12. The computer system of claim 8, wherein the operations further comprise:

selecting a batch size for the batch of data, wherein the batch size is selected to at least one of optimize performance in the data replication or increase an ability to detect an error in the data replication.

13. The computer system of claim 8 further comprising:

identifying a record in the data in the source database for replication;

determining a source record checksum for the record;

creating a change log that identifies a change to the record, wherein the change log includes the source record checksum; and sending the change log that identifies the change to the record for replication in the target database.

14. The computer system of claim 8, further comprising: in response to the comparison of the target checksum with the source checksum indicating that data integrity is not present for the batch of data, comparing the source record checksums with corresponding target record checksums to identify at least one record in the batch of data for which data integrity is not present.

15. A computer program product for verifying data integrity in a data replication, the computer program product comprising:

a set of one or more computer-readable storage media;

program instructions stored on the set of one or more computer-readable storage media to perform operations comprising:

receiving changes to data in a source database, wherein the changes are for replication in a target database;

creating a batch of data from the changes to the data, wherein the batch of data comprises changes to the data in records in the source database;

determining a target checksum for the batch of data, wherein determining the target checksum comprises:

determining a target record checksum for each record in the batch of data received for a target database to form target record checksums;

aggregating the target record checksums to form the target checksum; and aggregating source record checksums determined for corresponding records in the source database to form the source checksum;

determining whether the data integrity is present for the batch of data from a comparison of the target checksum with a source checksum for the batch of data; and replicating data in the batch of data in which the data integrity is present.

16. The computer program product of claim 15, wherein the operations further comprise:

receiving source record checksums in the records received from the source database.

17. The computer program product of claim 15, wherein the operations further comprise:

associating each record in the batch of data with a batch identifier, wherein replicating data in the batch of data comprises:

replicating data in the batch of data in which data integrity is present using the batch identifier.

18. The computer program product of claim 15, wherein the operations further comprise:

selecting an algorithm to determine the source checksum and the target checksum based on data in the batch of data, wherein the algorithm is selected to least one of optimize performance in the data replication or increase an ability to detect an error in the data replication.

19. The computer program product of claim 15, wherein the operations further comprise:

selecting a batch size for the batch of data, wherein the batch size is selected to at least one of optimize performance in the data replication or increase an ability to detect an error in the data replication.

20. The computer program product of claim 15, further comprising: in response to the comparison of the target checksum with the source checksum indicating that data integrity is not present for the batch of data, comparing the source record checksums with corresponding target record checksums to identify at least one record in the batch of data for which data integrity is not present.

* * * * *